Patented Dec. 15, 1953

2,662,899

UNITED STATES PATENT OFFICE 2,662,899

CHLORINATED CYCLIC ORGANIC TRITHIOCARBONATE AND PROCESS FOR PREPARING SAME

Joseph T. Bashour, New York, N. Y., assignor to Stauffer Chemical Company, a corporation of California No Drawing. Application July 29, 1950
Serial No. 176,763

8 Claims. (Cl. 260—327)

This invention relates to new and novel compounds made by the chlorination of various tri-thiocarbonates. The compounds resulting from this reaction have useful properties for the control and eradication of parasites or pests, such as fungi which commonly infest organic matter whether of plant or animal origin and whether in a living, natural, fabricated or synthetic state.

Tri-thiocarbonates are derivatives of tri-thiocarbonic acid, $H_2CS_3$; they are generally of the formula $R_1$—S—CS—S—$R_2$ and wherein the R's are the same or different constituents selected from the group consisting of hydrogen, alkyl, aryl, alkaryl and heterocyclic; these may be further substituted to include a polar group. The tri-thiocarbonate group —S—CS—S— may be included in a ring compound, e. g.,

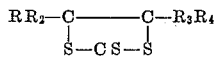

and wherein the R's are of the above definition; in addition to the foregoing, the ring may include four or six members. I have discovered that various tri-thiocarbonates can be chlorinated to produce products which are particularly useful as fungicides in that such products have a twofold action as against fungi in that the product in contact with a pestiferous organism exerts a lethal action against the pest, while the minute amount of vapors arising from the product exerts an arresting or fungistatic effect on pestiferous organisms in any space permeated by the vapors.

The products of this invention and resulting from the chlorination of the various tri-thiocarbonates can be employed in the vapor phase or in a manner similar to those used heretofore. To utilize the fungicidal vapor, the material can be placed so that only its vapors reach the area or articles to be treated; fruit wrappers and the like may be dipped or coated with a solution containing the compound. A spray coating of the material on the interior of a package will prevent the development of pestiferous organism on materials contained therein; the compound can also be pelleted after usual methods and then used as such or the compound can be placed in a container which will expose a free surface of the compound when placed in an area where the liberation of the arresting and fungistatic vapors are desired. When used in a manner similar to those employed heretofore, the usual concentrations of the compound may be used from about 0.1% up to the large concentrations employed in dusts, e. g., 50%–70%. In spraying plants, one can use an aqueous emulsion or suspension.

For preserving a solid material such as wood and the like, the wood can be impregnated with the compound or with a solution of the compound in an organic solvent. The material can be used in dust form with inert diluents, or in admixture with other agents. The dust form is, for instance, suited to treating seeds or other reproducing parts of plants. The material can also be used in protective coatings such as water paints to prevent mold growth on surfaces in food industry plants. The material can also be incorporated in and applied as an aerosol.

It is in general advisable in using the compound resulting from the chlorination of a tri-carbonate to add to the composition a substance or substances which improves the distribution and adherence of the composition over the material to be protected when spraying or dusting; thus, the compound can be combined with suitable materials which improve the distribution of the composition and which are generally of the type of protective colloids or act as deflocculating and/or wetting agents. Sulfonated oils, gums, gelatinous materials, soaps, caseinates, etc. have, in general, the properties desired; these are usually called spreaders or stickers.

The compounds contemplated by this invention are produced by chlorinating the tri-thiocarbonate, preferably while the tri-thiocarbonate is in solution, to ensure adequate contact between the reactants. When ethylene tri-thiocarbonate or propylene tri-thiocarbonate are used, the product is a heavy, oily liquid which is then recovered. When the total chlorine quantity is approximately equivalent to two or more mols per mol of the tri-thiocarbonate, the product has characteristics which differ from those of the product recovered when a lesser proportion of chlorine is utilized, one of the order of 1 to 1 or less than 2 to 1, although both products are biologically active. For example, the product resulting from use of the lower chlorine ratio does not liberate HCl on standing, whereas the product resulting from use of the higher chlorine liberates HCl. A typical product of each chlorination is as follows:

| Ratio | Sulfur | Chlorine | Refractive Index, 23° C. |
|---|---|---|---|
| 1 to 1 | 41.8 | 30.6 | 1.654 |
| 1 to 2 | 29.8 | 47.9 | |
| 1 to 2.5 | 28.4 | 47.5 | 1.6442 |
| 1 to 4 | 30.0 | 48.0 | 1.6445 |

The following is illustrative of a preferred procedure which can be utilized to produce one of the materials which is useful in accordance with this invention:

135 grams of ethylene tri-thiocarbonate were dissolved in 1,000 cc. of carbon tetrachloride. The solution was placed in a flask equipped with a stirrer, condenser and gas inlet tube extending beneath the surface of the liquid in the flask. Chlorine was then introduced, the mixture in the flask being heated to 65° C. At first the chlorine absorption was complete, a yellow precipitate forming concurrently as the chlorine was introduced. On the addition of 1.1 to 1.2 mols of chlorine and as the chlorine introduction continued, the precipitate dissolved and a clear solution was present in the reactor. At about 1.5 to 1.6 mols of chlorine, the rate of chlorine consumption decreased and traces of chlorine could be found in the reactor exit. After the addition of 2 mols or an excess of chlorine, the reaction mixture was cooled by pouring into finely chopped ice with vigorous stirring and then washed three times with water. The separated carbon tetrachloride solution containing the product was dried with anhydrous magnesium sulfate, filtered and the solvent removed at 40° to 50° under nitrogen and at a reduced pressure. The residual oil was the product.

The total time required for the foregoing reaction was six hours and the total quantity of chlorine introduced was 178 grams. The clear amber solution obtained was of an oily nature and weighed 200 grams. The carbon tetrachloride employed as a solvent in the chlorination prevents the reaction mixture from becoming too viscous during chlorine addition. Any other diluent which is non-reactive can be employed. The product is a consistently reproducible one when two or more molar equivalents of the chlorine are used.

The products made by the above process will contain from about 28% to 50% of sulfur, small quantities of carbon and hydrogen and the balance, usually from 50% to 30%, chlorine. The refractive index is of the order of 1.6 at 23° C. The average elementary composition of the mixture made with about two mols of chlorine is $C_3H_3S_2Cl_3$ and the analytical values of the four components support this average formula, but it cannot as yet be said whether the constituents preserve the cyclic structure of the tri-thiocarbonate or is a linear one.

The chlorine addition is continued for a period of several hours and until the reaction is complete. 65° to 70° C. is the optimum temperature range for the chlorination reaction; at 50° C. and lower a tarry viscous material is formed which gives off hydrogen chloride. At 90° C., the product is only slightly inferior to that obtained at 65° C.; at near or above the boiling point of the solvent, the system must be operated under pressure.

As other specific examples of tri-thiocarbonates, which can be chlorinated under the previously described conditions to provide products which are useful in the control and eradication of pests, one can employ any tri-thiocarbonate of which the following are typical:

Di-o-chlorobenzyl tri-thiocarbonate
Di-3,4-dichlorobenzyl tri-thiocarbonate
Di-2,4-dichlorobenzyl tri-thiocarbonate
Di-p-chlorobenzyl tri-thiocarbonate
Di-isoamyl tri-thiocarbonate
Di-normal amyl trithiocarbonate
Di-lauryl tri-thiocarbonate
2,5-dithiocyclopentanethione
Thiocarbonyl-bis-(thioglycollic amide)
Thiocarbonyl-bis-(thioglycollic acid)
3-phenyl-2,5-dithiocyclopentanethione
3-methyl-2,5-dithiocyclopentanethion
Di(beta-phenylethyl)-trithiocarbonate
(p-Chlorobenzyl-t-butyltrithiocarbonate)
Di-(n-octyl)-trithiocarbonate
(S-(t-butyldithiocarbono-thioglycollic acid)
(S-(t-dodecyldithiocarbono)-thioglycollic acid)
S-(amyldithiocarbono)-thioglycollic acid
t-Amyl-carboxymethyl-trithiocarbonate
t-Heptylcarboxymethyl-trithiocarbonate
t-Octyl-carboxymethyl-trithiocarbonate
n-Octyl-carboxymethyl-trithiocarbonate
n-Decyl-carboxymethyl-trithiocarbonate
n-Tetradecyl-carboxymethyl trithiocarbonate
Benzyl-carboxymethyl trithiocarbonate
t-Butyl-orthochlorobenzyl trithiocarbonate
t-Butyl-3,4-dichlorobenzyl-trithiocarbonate
t-Butyl-2,4-dichlorobenzyl-trithiocarbonate
Di-(2,4-dinitrophenyl) trithiocarbonate
Di-(2,4,6-trinitrophenyl)-trithiocarbonate
t-Butyl benzyl trithiocarbonate
3-chlorophenyl-2,5-dithiocyclopentanethion
p-Chlorobenzyl-carboxymethyl trithiocarbonate
n-Butyl carboxymethyl trithiocarbonate.

The foregoing is by no means exhaustive and other tri-thiocarbonates will occur to those skilled in the art which can be chlorinated successfully to provide pest eradicants and control within this invention.

To demonstrate the utility of the materials with respect to their fungistatic and fungicidal vapor phase action, the following illustrations are set forth:

A laboratory Petri dish was provided with a small glass cup measuring 1 cm. by 1 cm., which was inserted in the center of the dish and 20 milliliters of Difco potato dextrose agar added so as to surround the cup. In one dish the small cup was half-filled with the neutralized compound resulting from the chlorination of ethylene trithiocarbonate while the cup in the other dish was left unfilled to act as a control. After performing the above, the agar was infected with a strain of Aspergillus niger, a common saprophytic fungus, the covers placed on the Petri dishes and, with the control, kept at room temperature, 20° C., for a period of one week. At the end of this period an inspection of the plates revealed a luxuriant growth in the control plate while the plate exposed to the vapor of the product of the chlorination of ethylene trithiocarbonate supported no growth of the saprophytic organism whatsoever and later inspections, over a period of a month, revealed no evidence of growth.

In another instance, apricots and oranges were placed in closed containers under humid conditions (a) in the presence of vapor from the product resulting from the chlorination of ethylene tri-thiocarbonate and (b) in control containers not subjected to the vapors of this compound to act as a control. After a period of two weeks, the natural fungi infecting oranges, such as Penicillium digitatum and Penicillium italicum, and apricots, such as Scleratinia fructicola, under storage conditions, were evident in the control containers, while the fruit exposed to the vapors of the novel compound did not reveal any surface growth of fungi. The fruit was further inspected over a period of one month; that protected by the vapor did not reveal any growth and was fully suited for human consumption while the fruit in the control containers had completely spoiled.

In inert nutritive substrata such as Difco potato dextrose agar, the compound resulting from the chlorination of ethylene trithiocarbonate was effective in completely inhibiting the sporulation and growth of *Aspergillus niger* Sp., a common saprophytic fungus, at a concentration of 50 p. p. m. or less when incorporated in the nutritive agar; while agar not treated supported a luxuriant growth. Likewise, using the same method, I have found this compound effective in completely inhibiting the sporulation and growth of species of Macrosporium and Sclerotinia which are obligate parasites on stone fruits at concentrations of 25 p. p. m. and below. Using a method of evaluating fungicides adopted by the American Phytopathological Society, entitled the Spore Germination Test (see Phytopath, vol. 33, pp. 627–632, 1943), I have found the material resulting from the chlorination of ethylene trithiocarbonate to give a lethal concentration of 50% when used at concentrations of 10 p. p. m. and below, a property exhibited by only a very few commercial organic fungicides.

On pinto bean plants under greenhouse testing methods, I have found the material resulting from the chlorination of ethylene trithiocarbonate formulated in an aqueous spray to be effective in controlling bean powdery mildew, effecting 100% control at 500 p. p. m. and 80% control at 100 p. p. m. Bean "rust" was controlled by the same technique, effective 100% control at 500 p. p. m. and 75% control at 100 p. p. m., without adverse effects to the pinto bean plants.

Using the previously described agar plate testing technique, the product resulting from the chlorination of propylene trithiocarbonate under the previously described conditions was incorporated in Difco potato dextrose agar and the agar plate inoculated in the center of the dish with the desired spore suspension; it was found that the radial growth of *Aspergillus niger* colonies was inhibited as compared to the untreated controls in the following percentages:

100% inhibition when incorporated at 100 p. p. m.
100% inhibition when incorporated at 50 p. p. m.
20% inhibition when incorporated at 25 p. p. m.

Using *Rhizopus nigricans* as the inoculum, the following percentage inhibitation was obtained:

100% inhibition when incorporated at 100 p. p. m.
100% inhibition when incorporated at 50 p. p. m.
39% inhibition when incorporated at 25 p. p. m.

When sprayed on pinto bean plants in a standard greenhouse testing technique, the compound was effective in controlling the following plant pathogens expressed as percentage control over untreated plants:

100% inhibition against *Uromyces appendiculatus* at 1000 p. p. m.
100% inhibition against *Uromyces appendiculatus* at 500 p. p. m.
100% inhibition against *Erysiphe polygoni* at 1000 p. p. m.
60% inhibition against *Erysiphe polygoni* at 500 p. p. m.

The volatile fungicidity of this compound is illustrated by the following test:

20 cc. of Difco potato dextrose agar was added to each of two standard Petri dishes. Two "iodine" cups measuring 1 cm. x 1 cm. were placed in the center of the dish and the agar allowed to solidify. Spores of *Aspergillus niger* were then used to infest the agar of both plates and one drop of the compound placed in the iodine cup of one plate while the cup in the other plate was left empty to serve as a control. In three days, the control plate was completely overgrown by the test fungi; while the one drop of the compound had not permitted any growth in the test plate nor was any growth evident during a three-week period of inspection.

Similar results were obtained with the product resulting from chlorination of 3-methyl-2,5-dithiocyclopentanethion, with two mols of chlorine per mol of compound.

I claim:

1. A process for chlorinating by substitution a cyclic organic trithiocarbonate having the following formula:

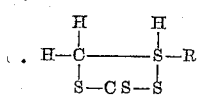

wherein R is a member selected from the group consisting of hydrogen, methyl, phenyl and p-chlorophenyl radicals, comprising passing chlorine into a solution of the trithiocarbonate in an inert solvent at a temperature of at least 50° C. to form a chlorine reaction product with the trithiocarbonate and recoverying the reaction product.

2. The process for chlorinating ethylene trithiocarbonate comprising introducing chlorine into a solution of ethylene trithiocarbonate at a temperature of at least 50° C. in the ratio of from 1 to 4 mols of chlorine per mol of the trithiocarbonate.

3. The process for chlorinating ethylene trithiocarbonate comprising introducing chlorine into a solution of ethylene trithiocarbonate at a temperature of at least 50° C. in the ratio of about one mol of chlorine per mol of the trithiocarbonate.

4. The process of claim 1 wherein the trithiocarbonate is 3-methyl-2,5-dithiocyclopentanethion.

5. The product of the process of claim 1, said product containing from about 30% to about 50% chlorine.

6. The product of the process of claim 3, said product containing from about 30% to about 50% chlorine.

7. The product of the process of claim 5, said product containing from about 30% to about 50% chlorine.

8. The composition having as an average empirical formula, $C_3H_3S_2Cl_3$, and obtainable upon the chlorination of ethylene tri-thiocarbonate with about two mols of chlorine per mol of trithiocarbonate at a temperature of at least 50° C., being an oily liquid having a refractive index at 23° C. of about 1.6.

JOSEPH T. BASHOUR.

References Cited in the file of this patent

UNITED STATES PATENTS

| Number | Name | Date |
|---|---|---|
| 2,163,535 | Berger | June 20, 1939 |
| 2,193,415 | Coltof | Mar. 12, 1940 |
| 2,498,936 | Badertscher | Feb. 28, 1950 |

OTHER REFERENCES

Cahours: Annales de Chemie et de Physique (3), 19, 162–3 (1847).

Berend: Annalen, 128, 333–5 (1863).